May 3, 1960 R. W. SCHMITT ET AL 2,935,694

SUPERCONDUCTING CIRCUITS

Filed Oct. 31, 1955 2 Sheets-Sheet 1

Inventors:
Roland W. Schmitt;
Milan D. Fiske,
by Richard R. Brainard
Their Attorney.

Inventors:
Roland W. Schmitt,
Milan D. Fiske,
by Richard R. Brainard
Their Attorney.

United States Patent Office 2,935,694

Patented May 3, 1960

2,935,694

SUPERCONDUCTING CIRCUITS

Roland W. Schmitt and Milan D. Fiske, Ballston Lake, N.Y., assignors to General Electric Company, a corporation of New York Application October 31, 1955, Serial No. 543,809

3 Claims. (Cl. 330—62)

Figure 1:
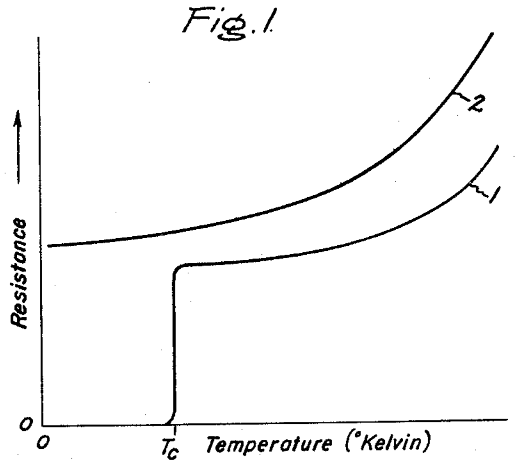

This invention relates to electrical circuits having electrical characteristics which are selectively variable with temperature and electromagnetic fields and more particularly to electrical circuits which contain one or more components which may be selectively caused to transform from or to a superconducting state.

As is well known, all metallic materials are to some degree capable of conducting electricity. Further, these materials have a "positive thermal coefficient of resistivity" or, stated otherwise, as their temperature is increased their resistance to the passage of electricity is increased and as their temperature is decreased their resistance decreases.

There are certain metallic elements and alloys which behave quite differently from others at temperatures approaching absolute zero in that at some low temperature, usually below 20° K., the resistivity of the material abruptly decreases from some finite value to zero. This behavior has been observed to occur when, for example, the following elements are cooled to the corresponding temperatures.

| Element: | Critical temperature ° K. |
|---|---|
| Tin | 3.73 |
| Lead | 7.20 |
| Aluminum | 1.20 |
| Vanadium | 4.89 |
| Indium | 3.40 |

Alloys of these and other elements have likewise been observed to behave in this manner at similar temperatures.

Materials having the property of zero resistance at such low temperatures have been referred to as "superconductors." The normal resistivity of these materials may be restored by increasing their temperatures to a point above that at which they became superconducting. Not all metallic elements and alloys have been found to possess superconductivity at low temperatures. For example, copper, silver, gold, magnesium, iron, nickel and cobalt, among others have been cooled to temperatures as low as 0.1° K. and have continued to have a definite and measurable resistivity.

It has been found that the superconductivity in superconducting materials may be influenced by subjecting the superconducting material to a magnetic field. For example, a material in the superconducting state or phase may be isothermally induced to return to the normal or finite resistance state by subjecting it to a magnetic field and when the magnetic field is removed the material again becomes superconducting. It should be noted, however, that the lower the temperature of the material with respect to the temperature at which it becomes superconducting, the greater will be the magnitude of the applied magnetic field necessary to cause the change of state or phase in the material. It is also possible to cause a superconducting material to pass from the superconducting state to the normal state isothermally by the passage therethrough of a current large enough to produce magnetic fields in and around the conductor which exceed the critical field.

Our invention is concerned with novel low temperature electrical circuits having low impedance characteristics and in particular to coupling circuits whose characteristics may be selectively varied by means of a controllable magnetic field imposed on one or more components in the superconducting state.

A principal object of our invention is the provision of improved circuits utilizing a control quantity to produce an amplified output by changing a superconductor element thereof from the superconducting state or phase to the normal state or phase. It is a further object of our invention to provide an amplifier which can be made extremely small and accordingly is well suited to use in information processing circuits where an extremely large number of operating components are necessary. A yet further object of our invention is the provision of improved circuits for changing a conducting element from the superconducting state to the normal state or from the normal state to the superconducting state by means of variable magnetic fields. Further objects and advantages of our invention will become apparent from the following disclosure when read in the light of the accompanying drawings.

Briefly stated, in accordance with one aspect of our invention, we provide improved electrical circuits for applying an input signal to a superconductive element in an output circuit whereby the changing resistance characteristics of the superconductor may be utilized to produce an amplified output signal to change the frequency characteristics of the output signal, to alter the waveform of the output signal, or to produce a pulse-type output signal which may be amplified.

Our invention will be better understood from the following description taken in conjunction with the accompanying drawings and its scope will be pointed out in the appended claims.

Figure 2:
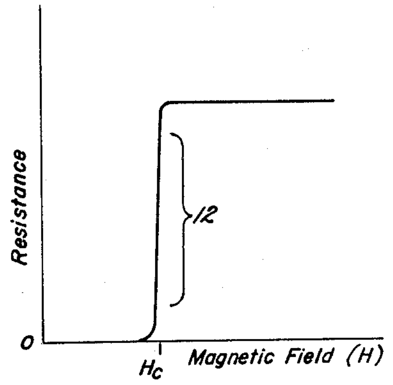
Figure 3:
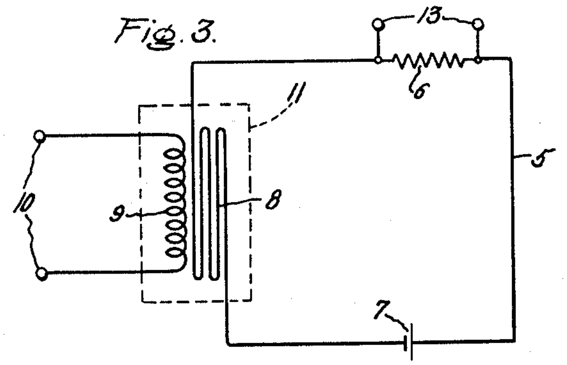
Figure 4:
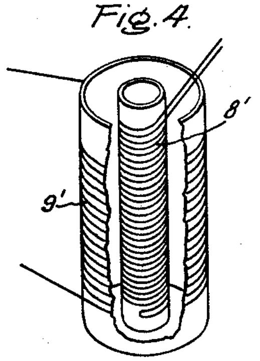
Figure 8:
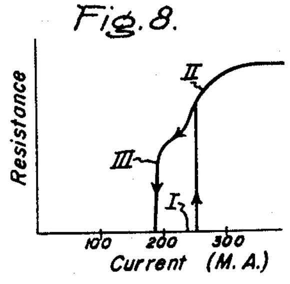
Figure 9:
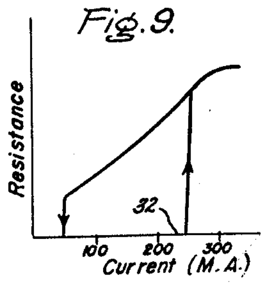
Figure 10:
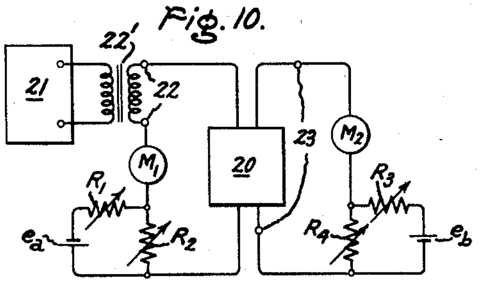
Figure 11:
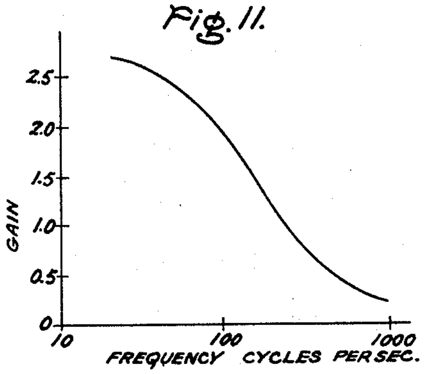
Figure 12:
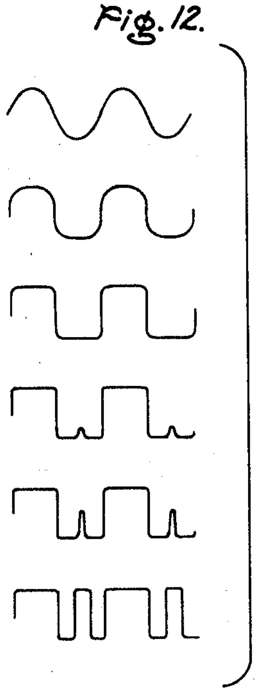
Figure 13:
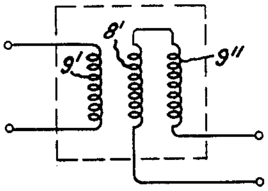
Figure 14:
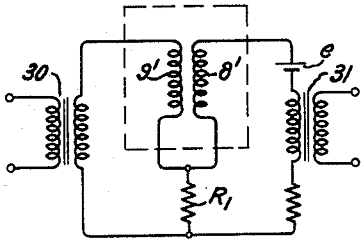
Figure 15:
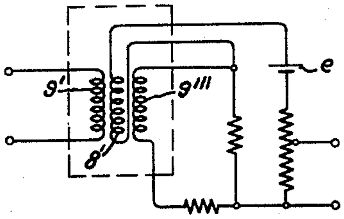

In the drawing, Figs. 1 and 2 are graphic representations of the resistance versus temperature and resistance versus magnetic field behavior of materials; Fig. 3 is a schematic circuit diagram of an amplifier; Fig. 4 is a detail of one embodiment of a superconducting couple; Figs. 5 to 9 are characteristic curves of superconducting couples; Fig. 10 is a circuit diagram of a superconducting amplifier; Fig. 11 is a graph of the gain versus frequency characteristics of the amplifier of Fig. 10; Fig. 12 is a showing of various output waveforms obtainable from the amplifier of Fig. 10; Fig. 13 illustrates an amplifier modification to provide feedback; Fig. 14 is a diagram of a pulse amplifier and Fig. 15 is a diagram of a superconducting circuit having thyratron characteristics.

As stated previously, the electrical resistance of superconductor materials may be sharply reduced from some finite value at a given critical temperature to zero by lowering the temperature of the conductor whereas the electrical resistance of non-superconducting materials is merely changed from one finite value to another finite value by temperature variations in the same temperature range. For example, substantially pure niobium becomes superconducting, i.e., its electrical resistance becomes zero in the absence of an applied magnetic field at a temperature of about 8.6° K. while the zero field transition temperature of tantalum is about 4.4° K. The curve 1 in Fig. 1 is a schematic illustration of the variation of electrical resistance of a typical superconducting material such as substantially pure niobium with temperature. The critical temperature or the temperature at which the sharp change in electrical resistance occurs is shown at $T_c$. The curve 2 is a schematic representation of the variation of the electrical resistance of a typical non-superconducting material such as substantially pure copper with temperature. In this regard, the electrical resistance of copper has been measured to temperatures as low as 0.1° K. without observing the typical sudden drop to zero resistance observed in superconducting materials.

If a typical superconducting material is maintained at a constant temperature below its zero magnetic field transition temperature and exposed to a gradually increasing magnetic field H, it will be found that at some value of field, $H_c$, the electrical resistance of the material will increase sharply to a finite value. This behavior is graphically illustrated in Fig. 2. The magnitude of the critical field necessary to accomplish the isothermal transition from the superconducting phase to the normal phase depends upon the material and the amount the temperature of the material is below the zero transition temperature. If the field is reduced, the resistance of the material will again be sharply reduced to zero at the critical field $H_c$. As the field is further reduced the electrical resistance remains at zero.

The schematic circuit of Fig. 3 illustrates an amplifier circuit having a simple superconducting coupling element. The circuit comprises a closed circuit 5 including a resistance 6, a source of electric current 7 and a core comprising a coil of superconductor wire 8 composed of tantalum, for example. A primary coil wire 9 is overwound on coil 8 or otherwise disposed thereto so that an electric current passed through terminals 10 and coil 9 will induce a magnetic field around and through coil 8. The coil 8 and preferably the coil 9 are provided with an enclosure 11 within which the temperature may be maintained below the zero field transition temperature of coil 8 so that it is in the superconducting phase in the absence of a magnetic field. If, as is preferred, the coil 9 is formed from niobium wire, both coils 8 and 9 are in the superconducting phase or state at an operating temperature of about 4.2° K. Such a temperature may be readily attained by immersion of the coils in liquid helium which has a boiling point of about 4.2° K. at atmospheric pressure. An electric current from source 7 is sent through coil 8 having a magnitude sufficient to hold the resistivity of coil 8 at a point in its mid-transition range, illustrated as zone 12 in Fig. 2. A small electrical signal passed through coil 9 will produce a magnetic field large enough to significantly modify the resistance of coil 8. This in turn causes a change in the current through the closed circuit 5 and hence produces a signal at the output terminals 13. This is a low impedance amplifier since the input coil 9 is maintained in the superconducting state or phase and its impedance is governed by the reactance of the input coil 9.

As schematically illustrated in Fig. 3, the magnetic field induced by coil 9 is parallel to the direction of the current passing through the major portion of the wire comprising coil 8. This relationship will hereinafter be referred to as couple A. In order to reduce or eliminate direct magnetic coupling effects coil A may be bifilarly wound as is well known in the art. Alternatively, as shown in Fig. 4, the coupling element comprising coils 8′ and 9′ may be wound in such a manner that the magnetic field induced by coil 9′ is approximately perpendicular to the direction of current passing through the major portion of the wire comprising coil 8′ as will be more fully disclosed later. This relationship will hereinafter be referred to as couple B. Preferably coil 8 is bifilarly wound to reduce or eliminate direct magnetic coupling effects.

Figure 5:
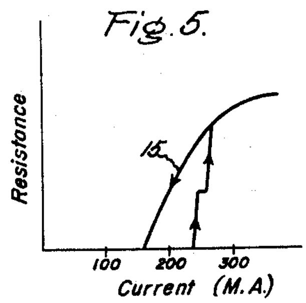
Figure 6:
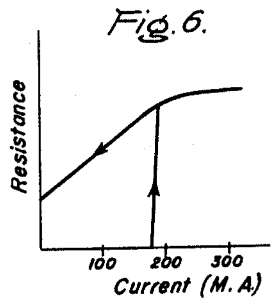
Figure 7:
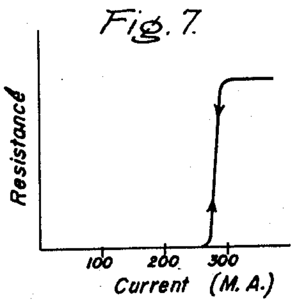

The couple A whose characteristics are illustrated in Figs. 5 and 6 comprised an input coil 9 consisting of 0.005 inch diameter niobium wire wound upon a ⅜ inch diameter glass tube in five serially connected layers containing a total of 945 turns. The output coil 8 consisted of about 100 feet of 0.0011 inch diameter tantalum wire which was wound lengthwise around a rectangular mica form, the width of the mica form being just small enough to slip into the interior of the glass tube. The couple B whose characteristics are illustrated in Figs. 7 to 9 comprised an input coil 9′ identical in construction to that described for couple A, previously. The output coil 8′ was constructed by bifilarly winding about 32 feet of 0.0011 inch diameter tantalum wire upon a ⅛ inch diameter glass tube which was then concentrically arranged within the tube supporting the input coil 9′.

In order to compare the characteristics of couples A and B reference is made to Figs. 5 through 9. In Fig. 5 an electric current of about 3.7 milliamperes was applied to coil 8 of couple A while the couple was maintained at about 4.2° K. As the current in coil 9 was increased to a value of about 230 milliamperes, the resistance of coil 8 rose sharply from zero as indicated in Fig. 5. There was a small discontinuity in the increase in resistance prior to the complete transition to the normal or finite resistance state but a small increase in current to about 250 milliamperes caused the transition to become complete. Upon lowering the current through coil 9 the resistance from coil 8 followed the curve path 15 to zero resistance.

In Fig. 6 the current applied to coil 8 of couple A was set at about 10 milliamperes and the couple was maintained at about 4.2° K. As the current applied to coil 9 was increased to about 175 milliamperes the resistance of coil 8 sharply increased from zero as shown corresponding to the transition of coil 8 from the superconducting phase to the normal state. When the current in coil 9 was reduced to zero it was found that the transition was not reversible under these conditions and that coil 8 would not return to the superconducting phase or state until the current passing through it was removed.

In Fig. 7 couple B was maintained at about 4.2° K. and a current of about 1.0 milliamperes was established in coil 8′. As the current passing through coil 9′ was increased to about 280 to 290 milliamperes, the resistance of coil 8′ increased sharply as it transformed from a superconducting state to the normal state. As the current through coil 9′ was reduced, the resistance of coil 8′ returned to the superconducting state retracing the curve as shown.

In Fig. 8 couple B was maintained at about 4.2° K. and a current of about 5.4 milliamperes was established in coil 8′. As the current passing through coil 9′ was increased to about 250 milliamperes, the resistance of coil 8′ sharply increased from zero to a finite resistance. As the current through coil 9′ was further increased, the resistance of coil 8′ increased along the curved line through zone II. As the current through coil 9′ was reduced, the resistance of coil 8′ dropped along the curved line to the knee portion of zone III and then sharply dropped to zero at a current value of about 190 milliamperes.

In Fig. 9 couple B was maintained at about 4.2° K. and a current of about 10 milliamperes was established in coil 8′. As the current passing through coil 9′ was increased to about 250 milliamperes, the resistance of coil 8′ sharply increased from zero to a finite resistance. As the current in coil 9′ was decreased from this value the resistance of coil 8′ decreased more slowly until the value of about 50 milliamperes at which point it dropped sharply to zero.

It will be seen from the foregoing that the transition curves illustrated in Figs. 8 and 9 show a hysteresis phenomenon in couple B similar to that exhibited by couple A in Figs. 5 and 6 when higher currents are applied to coil 8′.

A specific example of a circuit according to our invention utilizing a superconducting couple is illustrated in Fig. 10. In particular this example of an embodiment of our invention may include a couple 20 corresponding in construction to that shown in Fig. 4.

An input signal having a sinusoidal wave characteristic is generated by a conventional audio frequency oscillator 21 and introduced into the input circuit which consists of an ammeter $M_1$, voltage source $e_a$, resistors $R_1$ and $R_2$ and coil 9' of couple 20 through an appropriate transformer 22'.

The output circuit may consist of an ammeter $M_2$, voltage source $e_b$, resistors $R_3$ and $R_4$ and coil 8' of couple 20. The input and output voltages of the circuit are conveniently measured at 22 and 23, respectively.

This exemplary circuit may be utilized as an amplifier, a frequency doubler, a square wave generator and with a small modification an amplifier with feedback.

As a specific example of the circuit of Fig. 10 used as an amplifier, the components of the circuit have the following values: $e_a=2.03$ volts, $e_b=1.52$ volts, $R_1=1.3$ ohms, $R_2=0.4$ ohm, $R_3=1040$ ohms and $R_4=200$ ohms. $M_1$ and $M_2$ represent ammeters having internal resistances of 0.05 ohm and 3.0 ohms, respectively. The couple 20 was maintained at about 4.2° K. during the operation of the circuit and the current through coil 9' was maintained at 275 milliamperes and the current through coil 8' was maintained at 1.05 milliamperes.

A series of sinusoidal wave input signals having different frequencies were introduced in the input circuit and the input and output voltages were measured at 22 and 23, respectively, and the gain computed.

| Frequency (cycles per sec.) | Input Volts | Output Volts | Gain |
|---|---|---|---|
| 20 | 0.0010 | 0.0027 | 2.7 |
| | 0.0050 | 0.0118 | 2.36 |
| | 0.0100 | 0.0265 | 2.65 |
| | 0.0300 | 0.049 | 1.63 |
| 40 | 0.001 | 0.0755 | 2.55 |
| | 0.003 | 0.0725 | 2.42 |
| | 0.010 | 0.0260 | 2.60 |
| | 0.030 | 0.0500 | 1.67 |
| 80 | 0.001 | 0.00215 | 2.15 |
| | 0.003 | 0.00620 | 2.07 |
| | 0.010 | 0.0217 | 2.17 |
| | 0.030 | 0.0475 | 1.58 |

Similar measurements were made at 110, 150, 200, 250, 300, 400, 600 and 1000 cycles per second. The gain versus frequency characteristic of this amplifier is plotted in the graph shown in Fig. 11. It will be seen that for frequencies less than about 250 cycles the gain is greater than unity.

The characteristic waveform of the output signal of the circuit was observed as the input voltage varied by means of a conventional cathode ray oscilloscope. It was observed that as the input voltage was increased beyond about 0.030 volt, an appreciable distortion of the sinusoidal waveform of the output signal occurred. As, for example, 40 cycles and an input voltage of 0.10, the output waveform had a definitely square or rectangular configuration and as the input voltage was increased further, for example, to 0.62 volt, there was a doubling of the frequency at half wave intervals. This behavior is shown schematically in Fig. 12 in which the uppermost curve is a representation of the characteristic sinusoidal waveform of the output voltage when the input voltage is 0.030 and the input signal has a frequency of 40 cycles per second. The curves in descending order show the change in shape of the output signal as the input voltage is increased to 0.20, 0.50, 0.53 and 0.62 volt, respectively. Similar waveshape versus input voltage variations were observed at other frequencies. From the foregoing it may be seen that the exemplary circuit of our invention may be advantageously used as a square wave signal generator and as a frequency doubler, as well as an amplifier by appropriate selection of operating ranges of input voltages and frequencies.

As will be readily apparent to those skilled in the art, the amplifier circuit of our invention may readily be adapted by means of a simple modification to provide a "feedback" schematically shown in Fig. 13 by winding two coils 9' and 9'' around a single output element 8' in which organization one of the coils is the normal input coil 9' and the other coil 9'' is connected in series with coil 8'. As will be readily understood by those skilled in the art, whether the feedback adds to or subtracts from the amplifier output depends upon the direction of the field induced by coil 9'' with respect to the field of coil 8'. If the current through coil 9' increases, the resistance of coil 8' increases. This causes the current through 8' and 9'' to decrease thus changing the magnetic field produced by 9''. Depending upon whether the magnetic field produced by 9'' aids or opposes that produced by 9', this action constitutes negative or positive feedback.

Further, the superconducting couple 20 may be utilized in a pulse amplification circuit. The circuit illustrated in Fig. 14 may be utilized for this purpose with particular reference to the couple characteristic curve illustrated in Fig. 8. The voltage applied to the couple and the two resistances are selected to produce a steady state of coil 8' in the superconducting phase at point I and so that the total resistance in the output circuit is only slightly greater than the resistance in the ouput coil 8' when in the non-superconducting or normal state. When a current pulse is delivered to the input coil 9' through transformer 30 the resistance of coil 8' will suddenly increase as indicated by the vertical line in Fig. 8 to zone II on the curve. At this point, however, virtually all of the voltage drop due to the voltage source $e$ will appear across the output coil 8' and very little across $R_1$ feeding the input. Thus the input current will drop towards zero and the resistance path of coil 8' will follow the curve of Fig. 8 through zone III back to I so that the circuit is reset awaiting the next pulse. It is clear that with correct choice of circuit parameters this triggering action can result in a large pulse amplification through output transformer 31. It is also clear that the output pulse will be largely independent of the magnitude of the input pulse. With proper geometry and choice of position I relative to the resistance transition, it will be possible to discriminate between pulses as to magnitude and sign.

It is also contemplated that a superconducting couple 20 may be advantageously employed in a circuit as shown in Fig. 15 to function in the manner of a thyratron. With particular reference to the characteristic curve shown in Fig. 9, assume that the output coil 8' in Fig. 15 is supplied with a current sufficiently high so that when the input coil 9' is energized and then deenergized, the output coil 8' passes from the superconducting phase to the normal state and then back to the superconducting state along a hysteresis curve or path illustrated in the characteristic curve. The resistance in the circuit are such that the current supplied to the input coil 9' is only slightly less than that required to cause the coil 8' to transfer from the superconducting state to the normal state. In terms of Fig. 9 this current to coil 9' would be about 230 milliamperes indicated at 32. An input signal applied to coil 9' causes the current in coil 8' to increase to a value beyond the critical point and the resistance of coil 8' rises sharply as the coil passes from the superconducting to the normal state. If the resistance of output coil 8' is large enough, i.e., many times greater than the total other resistances in the output circuit, the current in the output circuit from source $e$ will fall to a value sufficiently small that the resistance of the output coil 8' will again be reduced to zero or the output coil 8' will become superconducting. If at this point the input pulse has terminated, the output circuit will assume its steady state condition indicated at point 32 in Fig. 9.

It will further be readily appreciated by those skilled in the art that the superconducting couples of our invention may be readily employed as memory devices when incorporated in circuits which supply sufficient current to the output coil 8 or 8' so that the couples display characteristic curves having hysteresis such as Figs. 5, 6, 8 and 9. For example, if the input current supplied to a couple having the characteristic curve shown in Fig. 6 is pulsed with a current greater than 200 milliamperes, the resistance of the output element increases and remains at a finite value as long as the 10 milliampere current is supplied to the output. To restore the output coil to the superconducting state, or, stated otherwise, to "erase the memory," the 10 milliampere output current must be interrupted or at least substantially reduced. When in the foregoing specific examples of our invention the input coil 9 or 9' of the couples have been disclosed as being made from a superconducting element, i.e., columbium, it is to be understood that a non-superconductor such as copper, for example, may be substituted therefor, if a low impedance input circuit is not necessary or desired.

It will be readily apparent to those skilled in the art that if desired, the input coil means 9 and 9' of the superconducting couples of our invention may be comprised of two or more coils which may be individually or collectively energized or if more than two in number, be selectively energized in any desired combination or in any desired sequence. Furthermore, it will be equally apparent that superconducting coil member 8 or 8' of our invention may similarly be comprised of a plurality of coils which may be subjected to the magnetic field of a single input coil, the fields of a plurality of input coils, the additive fields of a plurality of input coils, or the fields of a selected number of a greater number of input coils, if desired.

What we claim as new and desire to secure by Letters Patent of the United States is:

1. An electric circuit comprising a first superconductor having a superconductive state and a normal state and a transition resistance range between said states, an output circuit to be energized in circuit with said first superconductor, and input circuit means including a second superconductor having a superconductive state and a normal state said second superconductor being arranged and operatively related to the first superconductor to subject the said first superconductor to a magnetic field of variable intensity in response to a variable input signal to change the resistivity of said first superconductor through its transition resistance range to provide an output variable in accordance with the intensity of said input signal.

2. An amplifier circuit comprising a first superconductor coil having a superconductive state and a normal state and a transition resistance range between said states, an output circuit to be energized in circuit with said first superconductor, and input circuit means including a second superconductor coil having a superconductive state and a normal state, said second superconductor coil being arranged and operatively related to the first superconductor coil to subject the said first superconductor coil in its transition resistance range to a magnetic field of variable intensity in response to a variable input signal to change the resistivity of the first superconductor coil through its transition resistance range and thus provide an output of increased intensity variable in accordance with the intensity of said input signal.

3. An electric circuit comprising a first superconductor coil having a superconducting state and a normal state and a transition resistance range between said states, an output circuit to be energized in circuit with the first superconductor coil, means including an electric current source in circuit with the said first superconductor coil to maintain the first superconductor coil in its transition resistance range, and input circuit means including a second superconductor coil having a superconducting state and a normal state, said second superconductor coil being arranged and operatively related to the first superconductor coil to subject the said first superconductor coil in its transition resistance range to a magnetic field of variable intensity in response to a variable input signal to change the resistivity of the first superconductor coil to provide a variable output and produce a hysteresis-type shift in the transition resistance range of the said first superconductor coil.

References Cited in the file of this patent

UNITED STATES PATENTS

| | | |
|---|---|---|
| 2,533,908 | Andrews | Nov. 25, 1947 |
| 2,553,490 | Wallace, Jr. | May 15, 1951 |
| 2,666,884 | Ericsson et al. | Jan. 19, 1954 |
| 2,725,474 | Ericsson et al. | Nov. 29, 1955 |
| 2,743,322 | Pierce et al. | Apr. 24, 1956 |